United States Patent
Bangalore et al.

(10) Patent No.: US 10,366,357 B2
(45) Date of Patent: Jul. 30, 2019

(54) SYSTEMS AND METHODS FOR SITE-SPECIFIC TRACKING OF SNOWFALL

(71) Applicant: Telsco Industries, Inc., Garland, TX (US)

(72) Inventors: Venkataramu L. Bangalore, Plano, TX (US); William C. Savelle, Jr., McKinney, TX (US); Lex M. Mason, Sr., Dallas, TX (US)

(73) Assignee: Telsco Industries, Inc., Garland, TX (US)

( * ) Notice: Subject to any disclaimer, the term of this patent is extended or adjusted under 35 U.S.C. 154(b) by 621 days.

(21) Appl. No.: 14/683,937

(22) Filed: Apr. 10, 2015

(65) Prior Publication Data

US 2016/0300172 A1 Oct. 13, 2016

(51) Int. Cl.
*G06Q 10/06* (2012.01)
*G01W 1/14* (2006.01)
*G01W 1/10* (2006.01)

(52) U.S. Cl.
CPC ........ *G06Q 10/06315* (2013.01); *G01W 1/10* (2013.01); *G01W 1/14* (2013.01); *G01W 2203/00* (2013.01); *Y02A 90/14* (2018.01)

(58) Field of Classification Search
CPC ......... G06Q 10/06315; G06Q 30/0269; G06Q 30/0252; G01W 2203/00; G01W 1/10; Y02A 90/14
See application file for complete search history.

(56) References Cited

U.S. PATENT DOCUMENTS

| | | | | |
|---|---|---|---|---|
| 5,848,378 A | * | 12/1998 | Shelton | G01W 1/10 702/3 |
| 5,850,619 A | * | 12/1998 | Rasmussen | G01W 1/02 702/3 |
| 6,314,340 B1 | | 11/2001 | Mecham et al. | |
| 6,427,535 B1 | * | 8/2002 | Sakai | G01W 1/10 73/170.16 |

(Continued)

OTHER PUBLICATIONS

ETwater, *Complete Line of Smart Irrigation Solutions & Products*, accessed Mar. 6, 2015, http://etwater.com/complete-line-smart-irrigation-solutions-products, 14 pages.

(Continued)

*Primary Examiner* — Matthew S Gart
*Assistant Examiner* — Stephen S Swartz
(74) *Attorney, Agent, or Firm* — Haynes and Boone, LLP

(57) ABSTRACT

A central server containing a database receives snowfall data from weather stations that are contained at a multitude of different sites within a defined geographical area. The central server stores the snowfall data in the database, correlating the data with various user accounts. For instance, the data is correlated with the account of the owner of the site from which the data was received, and with the accounts of landscape contractors whom the owner of the site has engaged to clear snow from his site. The central server provides alerts to various user accounts based on the snowfall data. For instance, the server provides alerts to site owners based on the snowfall at their sites, and to landscape contractors based on the snowfall at sites they are engaged to clear snow from.

18 Claims, 18 Drawing Sheets

(56) References Cited

U.S. PATENT DOCUMENTS

| | | | |
|---|---|---|---|
| 6,823,263 B1* | 11/2004 | Kelly | G06Q 30/02 702/3 |
| 7,010,396 B2 | 3/2006 | Ware et al. | |
| 7,184,965 B2* | 2/2007 | Fox | G06Q 10/06 705/7.29 |
| 7,596,429 B2 | 9/2009 | Cardinal et al. | |
| 7,930,069 B2 | 4/2011 | Savelle, Jr. et al. | |
| 8,275,522 B1* | 9/2012 | Groeneweg | G06Q 10/06 701/50 |
| 8,494,683 B2 | 7/2013 | Piper et al. | |
| 8,634,814 B2* | 1/2014 | Root | H04M 3/42348 340/539.28 |
| 9,645,282 B2* | 5/2017 | Hale | G01W 1/02 |
| 9,792,522 B2* | 10/2017 | Shen | G06K 9/4652 |
| 2003/0004780 A1* | 1/2003 | Smith | G06Q 10/06 705/14.5 |
| 2007/0112511 A1* | 5/2007 | Burfeind | G06F 17/30241 701/469 |
| 2007/0193072 A1* | 8/2007 | Fox | E01B 19/00 37/199 |
| 2008/0133429 A1* | 6/2008 | Horowitz | G06Q 40/00 705/36 R |
| 2009/0138105 A1 | 5/2009 | Crawford | |
| 2009/0259349 A1* | 10/2009 | Golenski | G07C 5/008 701/2 |
| 2009/0292470 A1* | 11/2009 | Curry | G01W 1/14 702/3 |
| 2010/0182163 A1* | 7/2010 | Rennie | G08G 1/017 340/905 |
| 2012/0303268 A1 | 11/2012 | Halahan et al. | |
| 2013/0024336 A1* | 1/2013 | Jones, Jr. | G06Q 30/06 705/34 |
| 2014/0062725 A1* | 3/2014 | Maston | G08G 1/0112 340/905 |
| 2015/0100380 A1* | 4/2015 | Jones, Jr. | G06Q 30/0206 705/7.31 |
| 2015/0364027 A1* | 12/2015 | Haupt | G01W 1/02 340/521 |
| 2016/0343093 A1* | 11/2016 | Riland | G06Q 10/04 |
| 2017/0249056 A1* | 8/2017 | Rainey | G06Q 50/26 |
| 2019/0019217 A1* | 1/2019 | Bhowmick | G06Q 30/0252 |

OTHER PUBLICATIONS

Weathermatic.com, *Our Products*, accessed Mar. 6, 2015, http://www.weathermatic.com/our-products, 46 pgs.

* cited by examiner

| | Site ID | Address | Snowfall Data | | | | Owner Account # | Assoc. Account # |
|---|---|---|---|---|---|---|---|---|
| | | | Past | | | Current | Future | | |
| 1. | 0001 | 1234 Plains Dr. | 1.25" | 3" | 4.25" | 4" | 3.75" | 29061 | 90823 |
| 2. | 0002 | 5036 Yule St. | ... | ... | ... | ... | ... | 36925 | 91635 |
| 3. | 0003 | 6923 Bard St. | | | | | | 43528 | ∅ |
| 4. | ... | | | | | | | ... | ... |
| 5. | | | | | | | | | |
| ... | | | | | | | | | |

FIG. 3

SYSTEMS AND METHODS FOR SITE-SPECIFIC TRACKING OF SNOWFALL

TECHNICAL FIELD

This application relates to weather monitoring and alert systems and, more specifically, to weather monitoring and alert systems having site-based monitoring of snowfall data and alerts based thereupon.

BACKGROUND

Modern weather reporting and forecasting is assisted by local full service weather stations which collect various types of climatic data such as temperature, wind speed, wind direction, rainfall, and snowfall. These weather stations are typically spread out over municipalities, and popular weather reporting services provide the weather for a specific location based on extrapolations from the nearest weather stations. For many people and for most purposes, such extrapolated weather information works well enough. For snowfall, however, site-specific information is particularly useful.

Snowfall, unlike other forms of precipitation, accumulates at the specific site where it lands and eventually becomes an obstruction to daily activities at that site. Private property owners may not be able to move their vehicles out of their driveways. Business owners may have parking lots piled high with snow, preventing employees or customers from getting into the business. Sidewalks may become impassable. For this reason there exist regulations and industries dedicated to handling snow accumulation.

Snow removal contractors enter into contracts with businesses, individuals and governments to plow and relocate snow. These contracts may require the contractors to remove snow as it accumulates without the property owner having to notify the business, or they may require the contractors to move the snow after being notified by the property owner. Whichever form the contract takes, contractors receive surges of work during times of heavy snowfall and they are interested in maximizing their efficiency and clearing snow before it becomes a problem. Currently, contractors lack any weather data more specific than the weather maps available to the public via weather reporting news programs and websites. Therefore, on days and nights when heavy snowfall is predicted, contractors pre-emptively deploy their equipment near sites they are contracted to clear, and the equipment operators drive from site to site visually checking snowfall amounts to see if it needs to be cleared. This is far from optimal, and there is therefore a demand for site-specific acquisition and analysis of snowfall data to allow snow removal contractors and their customers to more accurately assess snowfall conditions at specific property sites.

BRIEF DESCRIPTION OF THE DRAWINGS

FIG. 3 illustrates an example database according to an embodiment of the present disclosure.

DETAILED DESCRIPTION

The present disclosure provides a system and method for acquiring site-specific snowfall data and providing user accounts with snowfall analysis and alerts at various sites. A property owner installs a weather station at their site which is capable of monitoring snowfall. The weather station monitors snowfall at the site and sends snowfall data to a central server. The central server processes the data and sends out analysis and alerts to various types of user accounts. A property owner may register an account to receive real-time updates, historical analysis and future projections of snowfall at their site as well as alerts when various snowfall conditions exist. A landscape contractor may register an account to receive real-time updates, historical analysis and future projections of snowfall at the sites of clients who have weather stations installed as well as alerts when various snowfall conditions exist. Owners and landscapers may also have access to accounts that are not limited to specific sites, thereby allowing access to wide ranging snowfall data across a city, state, or nation.

Figure 1:
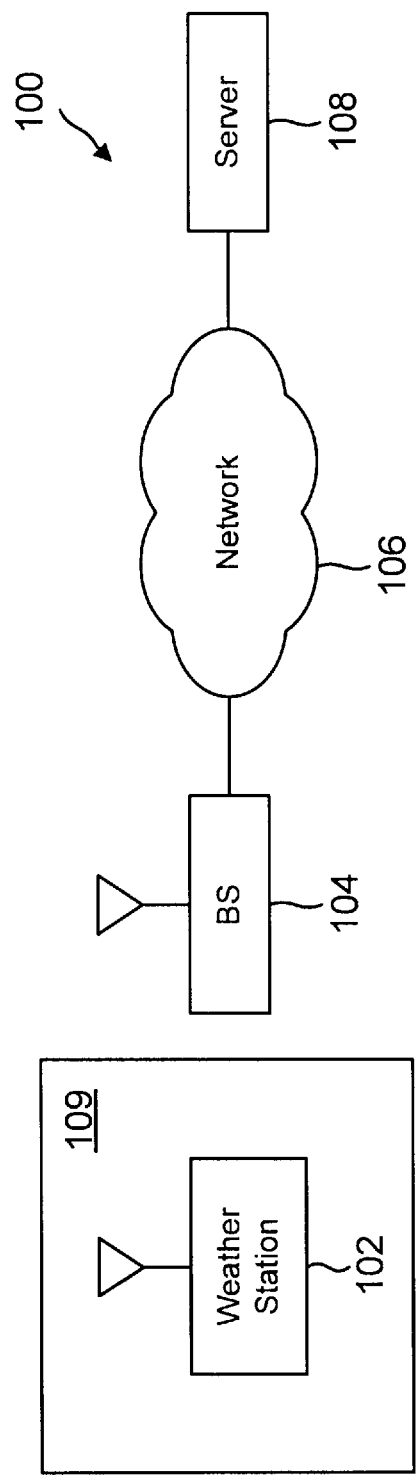
FIG. 1 illustrates a block diagram of a snowfall data measuring system according to an embodiment of the present disclosure.

Referring now to FIG. 1, there is illustrated a block diagram of a deployed system 100, according to one embodiment. A weather station 102 is deployed at a specific site 109. The weather station 102 contains various sensors to measure climatic features like temperature, wind speed, wind direction, rainfall, and snowfall. Some large sites with multiple separate areas, for example an airport, may have multiple weather stations 102 deployed in different areas. The weather station 102 may acquire snow data constantly or periodically. In some embodiments, the acquisition of snowfall data may only be triggered when the weather station 102 senses that the temperature is below a preset threshold. In some embodiments, the snowfall sensor is a standalone piece of equipment that can operate independently and in place of weather station 102 for purposes of this disclosure.

In some embodiments of the present disclosure, the snowfall sensor measures snowfall data including depth or amount of snowfall and density of snowfall. The snowfall sensor may measure amount of snowfall by, for example, use of light or sonic sensors mounted at a known height above the ground surface in a ground-facing position. The sensor may then take periodic measurements of the distance to the ground surface from the sensor and compare them to the known distance to the ground surface. A difference between the measured and known distance to ground indicates an accumulation of snowfall. It is understood that those skilled in the art will recognize that alternative methods of sensing snowfall data are compatible with all embodiments of the present disclosure.

In some embodiments of the present disclosure, the weather station 102 may be part of a site-based weather monitoring system that uses climatic data to intelligently control site-specific functions such as irrigation. For example, site 109 may also have an irrigation controller for automatically irrigating the site. The irrigation controller may be put into communication with a host device configured to use climatic data from the site 109 to intelligently program the irrigation controller for optimal irrigation. The host device, in turn, may be in communication with the weather station 102 to collect climatic data local to the site 109. The host device may additionally be configured to automate other site maintenance functions.

The weather station 102 is in wireless communication with a base station 104. The communication between the weather station 102 and the base station 104 may be over any wireless protocol, such as 3G, 4G, 5G, or the like. The weather station 102 and base station 104 may be directly or indirectly in communication. For example, the weather station 102 may communicate data to the host device that coordinates various other activities, and the host controller may in turn communicate with the base station 104. The base station 104 in turn connects via a network 106, such as a cellular data network, to a central server 108.

The central server 108 receives the snowfall data, performs analysis on it, and correlates accounts with information based on the analysis. When implemented via computer-executable instructions, various elements of embodiments of the present disclosure are in essence the software code defining the operations of such various elements. The executable instructions or software code may be obtained from a tangible readable medium (e.g., a hard drive media, optical media, RAM, EPROM, EEPROM, tape media, cartridge media, flash memory, ROM, memory stick, network storage device, and/or the like). In fact, readable media can include any medium that can store information.

Figure 2:
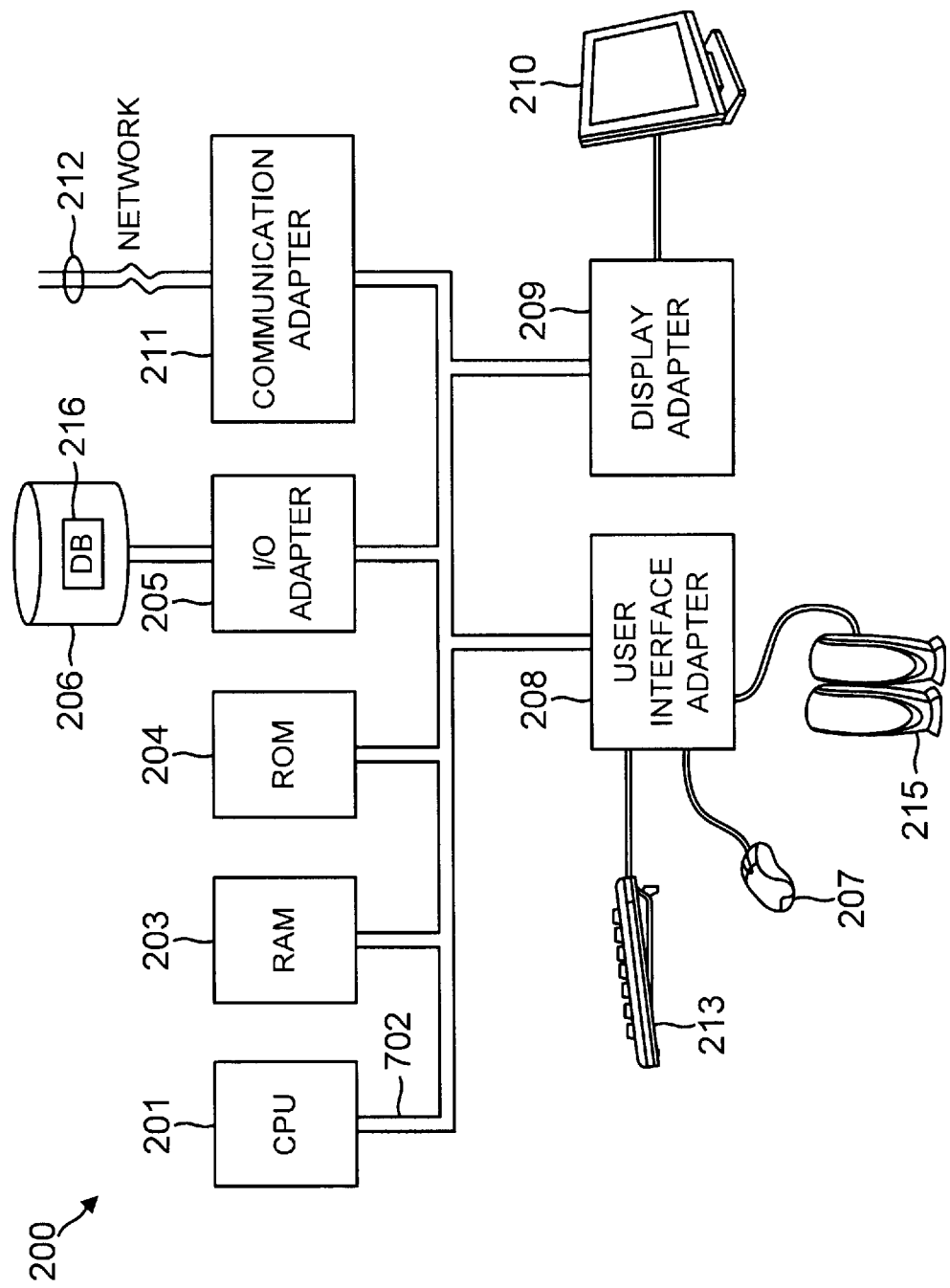
FIG. 2 illustrates a block diagram of a computer system adapted according to an embodiment of the present disclosure.

FIG. 2 illustrates an example computer system 200 adapted according to one embodiment of the present disclosure. That is, computer system 200 comprises an example system on which embodiments of the present disclosure may be implemented (such as a processor-based device providing data analysis functionality, a server computer associating data with accounts, a mobile computing device to access a user account, and a database storing account and snowfall data). Examples of computers that may conform to the architecture shown in FIG. 2 include, for example, central server 108, a mobile computing device on which a user interacts with a user interface (e.g., device 400 of FIG. 4), and a laptop, tablet, or other computer used to interact with central server 108.

Central processing unit (CPU) 201 is coupled to system bus 202. CPU 201 may be any general purpose or specialized purpose CPU. However, the present disclosure is not restricted by the architecture of CPU 201 as long as CPU 201 supports the inventive operations as described herein. CPU 201 may execute the various logical instructions according to embodiments of the present disclosure.

Computer system 200 also preferably includes random access memory (RAM) 203, which may be SRAM, DRAM, SDRAM, or the like. Computer system 200 preferably includes read-only memory (ROM) 204 which may be PROM, EPROM, EEPROM, or the like. RAM 203 and ROM 204 hold user and system data and programs.

Computer system 200 also preferably includes input/output (I/O) adapter 205, communications adapter 211, user interface adapter 208, and display adapter 209. I/O adapter 205, user interface adapter 208, and/or communications adapter 211 may, in certain embodiments, enable a user to interact with computer system 200 in order to input information, such as requesting snowfall data for a site from a client device, requesting a landscape contractor's snow clearing services from a client device, or the like.

I/O adapter 205 preferably connects to storage device(s) 206, such as one or more of hard drive, compact disc (CD) drive, solid state drive, etc. to computer system 200. The storage devices may be utilized to store, for instance, a database 216. Communications adapter 211 is preferably adapted to couple computer system 200 to communication link 212 (e.g., network 106, the Internet, a LAN, a cellular network, etc.). User interface adapter 208 couples user input devices, such as keyboard 213, pointing device 207, and/or output devices, such as speaker(s) 215 to computer system 200. In some embodiments, such as those shown below in FIGS. 4, 6, 8, 10, 12, and 14, the user input device may be a touch screen. Display adapter 209 is driven by CPU 201 to control the display on display device 210 to, for example, display the results of a snowfall data request or snowfall clearing service request to a human user at a client device.

While FIG. 2 shows a general-purpose computer, it should be noted that the exact configuration of a portion of a system according to various embodiments may be slightly different. For example, a given processor-based device in one or more examples may be implemented as any suitable computer, such as a laptop computer, a tablet computer, a server computer, a smartphone, and/or the like.

In accordance with embodiments of the present disclosure, computer system 200 performs specific operations by CPU 201 executing one or more sequences of one or more instructions contained in system memory component 203. Such instructions may be read into system memory component 203 from another computer readable medium, such as ROM 204 or drive 206. In other embodiments, hard-wired circuitry may be used in place of (or in combination with) software instructions to implement the present disclosure.

Logic may be encoded in a computer readable, non-transitory medium. Such a medium may take many forms, including but not limited to, non-volatile media and volatile media. In various implementations, non-volatile media includes optical or magnetic disks, such as disk or solid-state drive component 206, and volatile media includes dynamic memory, such as system memory component 203. CPU 201 reads application code from the readable medium and executes the code to provide the functionality described further below. This functionality includes, for example, performing the actions of the flowcharts of FIGS. 5, 7, 9, 11, 13, 16, 19, and 21.

In various embodiments of the present disclosure, execution of instruction sequences to practice the present disclosure may be performed by computer system 200. In various other embodiments of the present disclosure, a plurality of computer systems (not shown) coupled by communication link 212 (e.g., a communications network, such as a LAN, WLAN, PTSN, and/or various other wired or wireless networks, including telecommunications, mobile, and cellular phone networks) may perform instruction sequences to practice the present disclosure in coordination with one another.

Referring now to FIG. 3, there is illustrated an embodiment of the database 216 in central server 108. In some embodiments, the database 216 stores snowfall data correlated with user accounts. The database 216 contains data sets 302, where each data set 302 may contain multiple pieces of data, such as a site ID number 304, an address 306, snowfall data 308, the site owner's account number 316, associated account numbers 318, legal snowfall accumulation limits at site 109, or the like. The address 306 may include map coordinates corresponding to the site 109, for instance GPS coordinates or the like. Snowfall data 308 may further comprise several subsets of data, such as historical snowfall data 310, current snowfall data 312, and predicted snowfall data 314. Associated accounts may be, for instance, the accounts of landscape contractors with whom the site owner has a contract for clearing snow from the site. In some embodiments, the central server 108 may maintain the database 216 by, for example, editing, adding, or deleting entries. The central server 108 may also read entries from the database 216.

Figure 4:
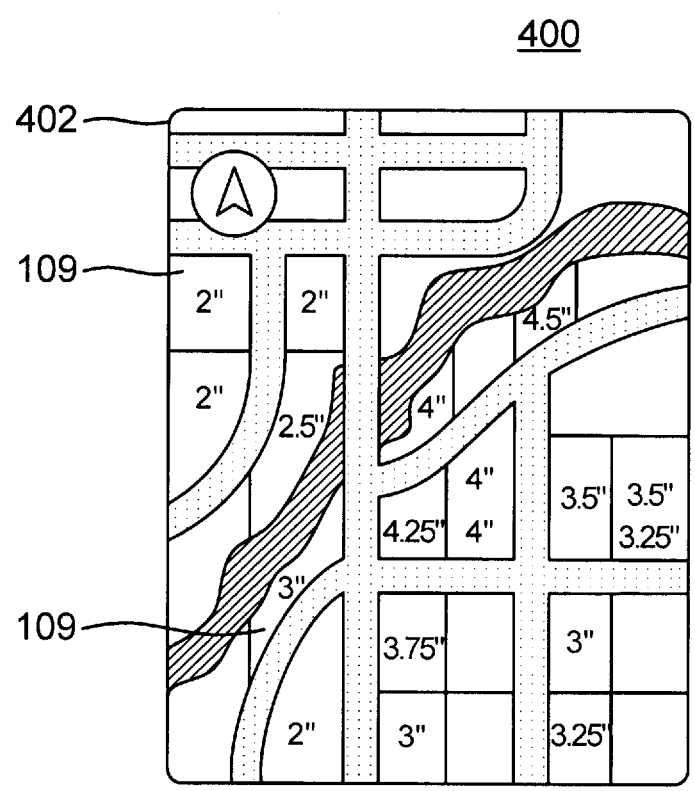
FIG. 4 illustrates an example graphical user interface on a mobile computing device configured to display snowfall alert data in a map format according to an embodiment of the present disclosure.

Referring now to FIG. 4, there is illustrated an embodiment of a user interface displaying snowfall alert data output to an account having one or more sites associated with it. For example, this could be a residential property owner's account, a residential landlord's account, a commercial property owner's account, or a landscaping contractor's account. Device 400 may be any kind of device the same as or similar to the architecture shown in FIG. 2. For instance, device 400 may include a smart phone, a tablet computer, a laptop computer or other device that may be used by a human user to display the data described herein. In one example, device 400 is a tablet or smart phone that runs a specialized application that makes requests for data to central server 108 and is further adapted for providing the user interface on a touchscreen or other output device.

The device 400 displays a map 402, which may be provided by any mapping service such as Google® Maps™, Apple® Maps, MapQuest®, or any other commercially available service or proprietary system. Snowfall data for sites 109 is displayed as snowfall alert data on the map 402 at the map coordinates that correspond to each respective site 109. In some embodiments, only information about individual sites 109 that are equipped with weather stations 102 and that are associated with the device operator's account are overlaid on the map 402. In another embodiment, information about sites 109 equipped with weather stations 102 that are not linked to the operator's account are also displayed on map 402. In this case, sites 109 linked to the account may be displayed in a differentiated manner, such as having a colored boundary or background. In some embodiments, the system may use snowfall data from sites 109 equipped with a weather station 102 to interpolate snowfall levels at sites 109 which are not equipped with weather stations 102. In some embodiments, the amount of snowfall at a site 109 is indicated by a number displayed within the boundaries of site 109. In some embodiments, the amount of snowfall may be indicated by a color filling in the area within the boundaries of the site 109. In fact, any appropriate visual indicator may be used in various embodiments.

In some embodiments, the snowfall data displayed represents the most recent measurements taken by the weather stations 102 at the corresponding sites 109. In another embodiment, the snowfall data displayed represents a prediction of future snowfall based on climatic data, such as temperature, wind speed and wind direction, gathered by the weather station 102. A contractor may use this information to direct snow clearing resources such as equipment and employees to sites 109 most in need of clearing, or to plan an order for addressing each site 109.

Figure 5:
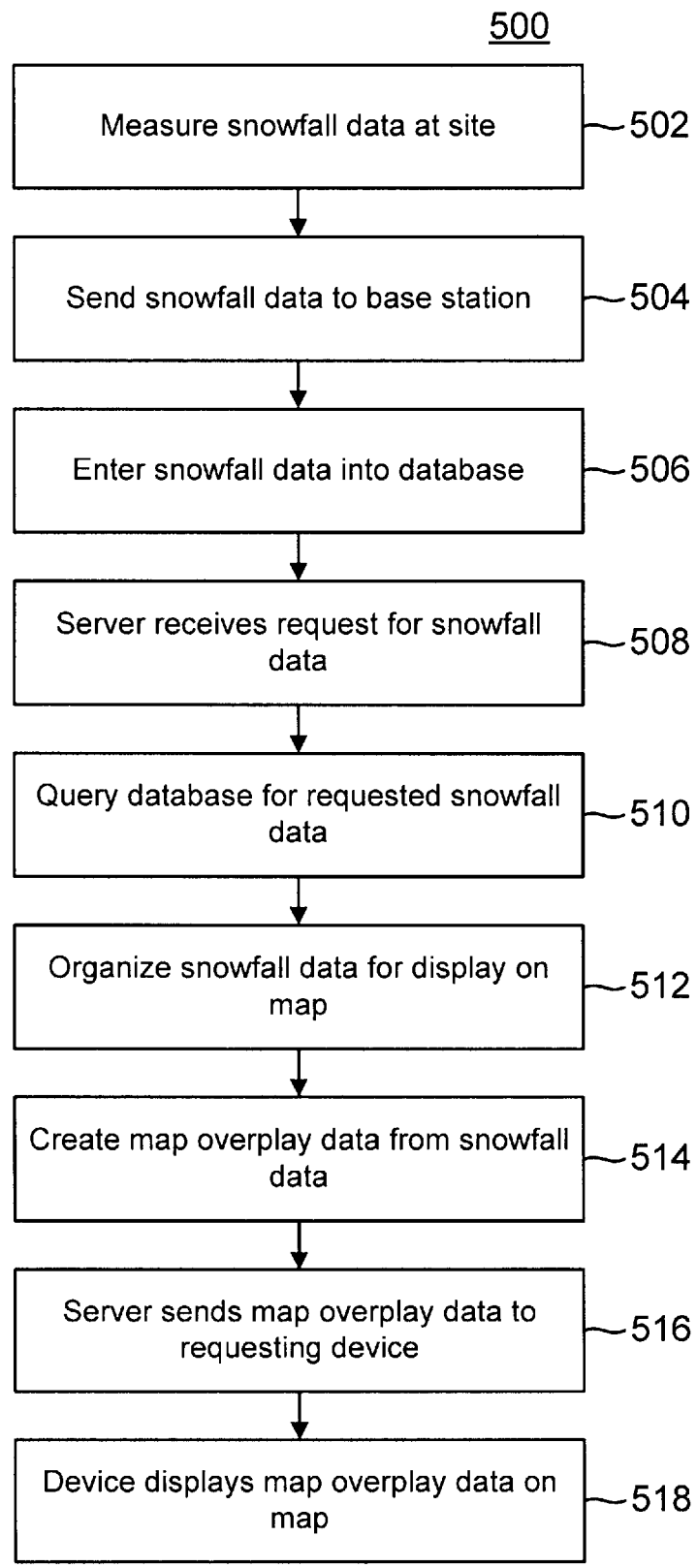
FIG. 5 illustrates an example method for providing snowfall alert data to user devices with the graphical interface of FIG. 4.

Referring now to FIG. 5, there is illustrated a flowchart of a method 500 for providing the snowfall alert data of FIG. 4. Beginning at block 502, the weather station 102 measures snowfall data at a site 109. Moving to block 504, in some embodiments, the weather station 102 sends the snowfall data is via base station 104 through network 106 to central server 108. In some embodiments, a host controller at site 109 relays the snowfall data from the weather station 102 to the base station 104. Moving to block 506, the central server 108 enters the snowfall data into the database 216. Specifically, the central server 108 enters the snowfall data as current snowfall data 312 within the data set 302 that corresponds to the site owner's account number 316. The actions of blocks 502-506 may also take place before the beginning of the flowcharts of FIGS. 7, 9, 11, 13, 16, 19 and 21.

Moving to block 508, the central server 108 receives a request from a device 400 associated with a user account, for instance a landscape contractor's user account, for snowfall data from sites 109 associated with the user account. In some embodiments, the request may contain a list of site owner account numbers 316 correlated to the sites 109 for which data is being requested. In some embodiments, the request may contain map data related to map 402, for example the boundaries of map 402. Moving to block 510, the server 108 queries database 216 to retrieve the requested data. In some embodiments, the request is limited to data from sites that are within the boundaries of map 402. In some embodiments, the query retrieves all data sets 302 for which the requesting user's account number is included in the data set 302 as an associated account number 318. In other embodiments, the query retrieves all data sets 302 corresponding to the list of site owner account numbers 316 in the request. In various embodiments, retrieving a data set 302 may include retrieving only the historical snowfall data 310, the current snowfall data 312, the predicted snowfall data 314, or some combination thereof.

Moving to block 512, the server 108 organizes the retrieved data for display on map 402 on device 400 as snowfall alert data. In various embodiments, the server 108 uses data sets 302 to associate the snowfall data 308 (e.g., historical snowfall data 310, the current snowfall data 312, the predicted snowfall data 314, or some combination thereof) with addresses 306 for requested sites 109. Moving to block 514, the server 108 then overlays the snowfall alert data over the map 402 at addresses 306, creating map overlay data. Moving to block 516, the server 108 sends the map overlay data back to the device 400. Moving to block 518, the device 400 displays the map overlay data on map 402.

Figure 6:
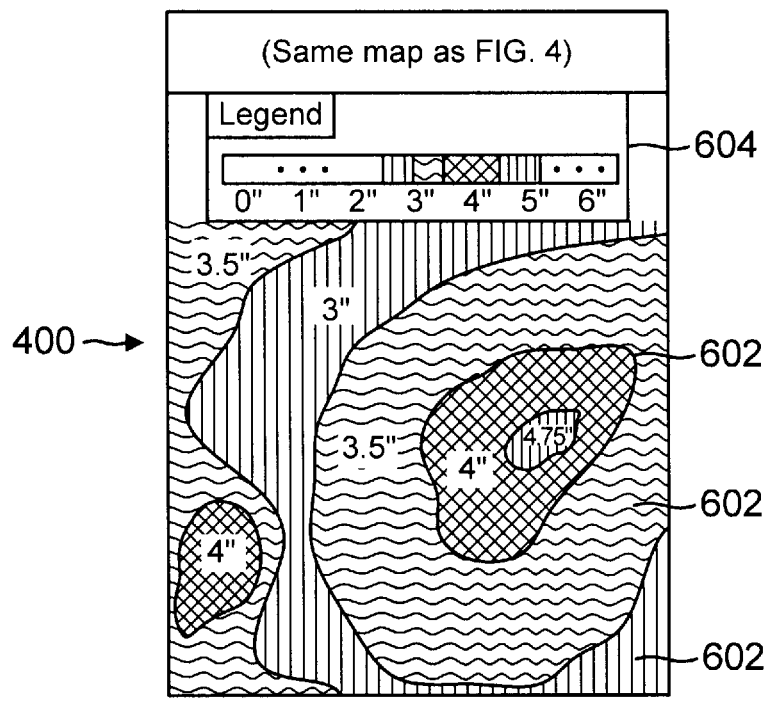
FIG. 6 illustrates an example graphical user interface on a mobile computing device configured to display snowfall alert data in a choropleth map format according to an embodiment of the present disclosure.

Referring now to FIG. 6, there is illustrated a further embodiment of a user interface displaying snowfall alert data output to an account having one or more sites associated with it. The device 400 displays a map 402 as described with reference to FIG. 4. Snowfall data from the multiple local sites is aggregated and displayed as snowfall alert data in a "heat map" or choropleth style overlaid onto map 402. Zones 602 of the heat map correspond to areas where a designated range of snowfall has occurred. Zones 602 may be colored, textured, or the like to indicate the snowfall amount within the area covered by each zone 602. In some embodiments, a legend 604 may be used to indicate the snowfall amount that each color or pattern represents. In some embodiments, a number indicating the amount of snowfall in a zone 602 may be displayed superimposed over each zone 602 of the heat map. In some embodiments, sites 109 which are associated with the operator's account are highlighted on the heat map, such as by outlining the boundaries of the sites 109 in red or by highlighting the area of sites 109 in a unique color or pattern from the heat map. In some embodiments, the heat map of FIG. 6 includes interpolation of data from nearby sites 109 with weather stations 102 installed to fill in data on snowfall at sites 109 that do not have weather stations 102 installed. In some embodiments, the zones 602 may be animated to illustrate snowfall over time, including previously recorded snowfall amounts and predicted snowfall amounts.

Figure 7:
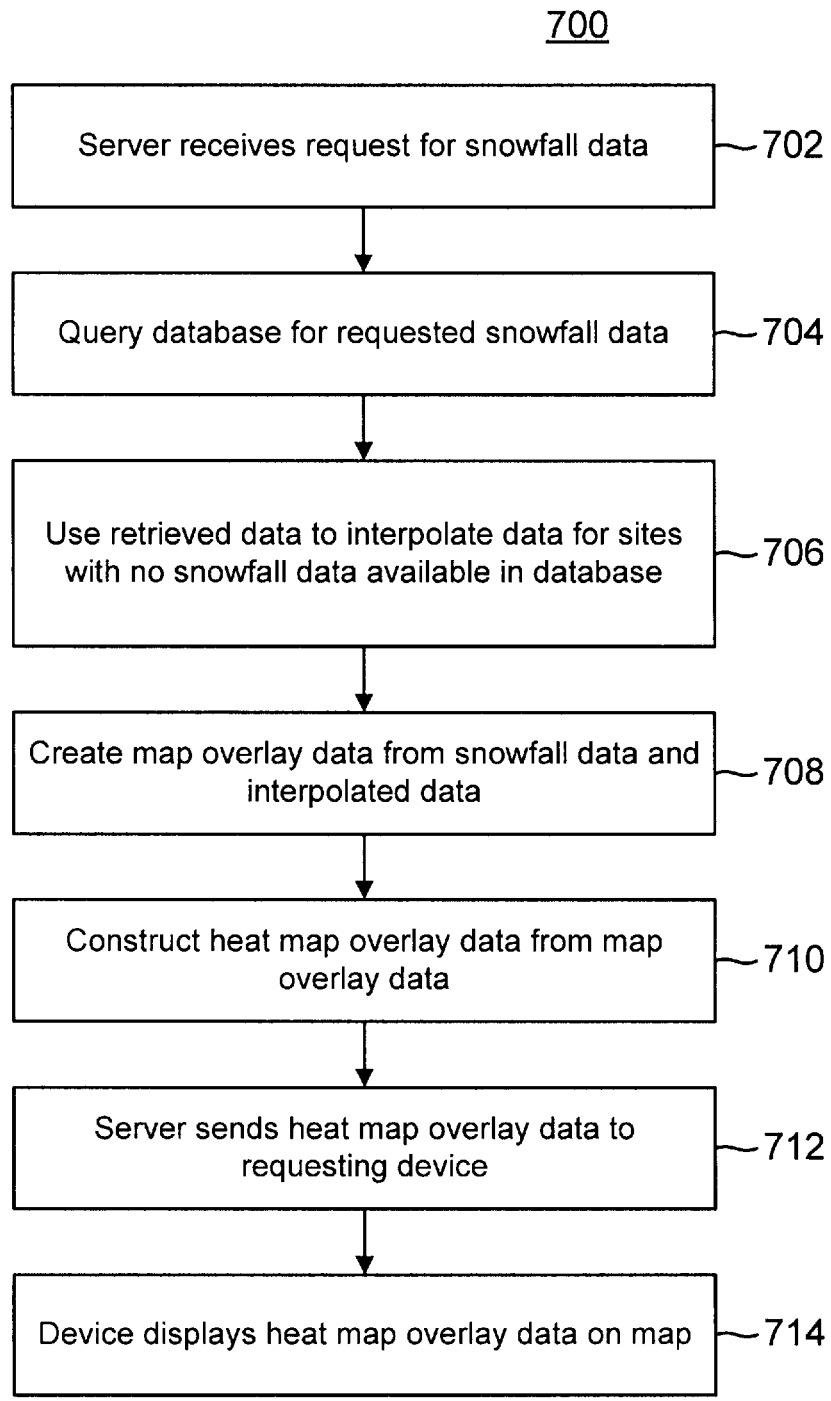
FIG. 7 illustrates an example method for providing snowfall alert data to user devices with the graphical interface of FIG. 6.

Referring now to FIG. 7, there is illustrated a flowchart of a method 700 for providing the heat map data of FIG. 6. In this example, method 700 includes among other things searching a database (such as database 216 of FIG. 3) for desired data, processing that data into usable data, and providing meaningful output in a visual form to a client device such as device 400.

Beginning at block 702, the central server 108 receives a request from a device 400 associated with a user account, for instance a landscape contractor's user account, for snowfall alert data from sites 109 associated with the user account. In some embodiments, the request may contain a list of site owner account numbers 316 correlated to the sites 109 for which data is being requested. In some embodiments, the request may contain map data related to map 402, for example the boundaries of map 402. Moving to block 704, the server 108 queries database 216 to retrieve the requested data. In some embodiments, the request is limited to data from sites that are within the boundaries of map 402. In some embodiments, the server 108 retrieves all data sets 302 for all sites 109 that are within the boundaries of map 402. In some embodiments, the query retrieves only data sets 302 for which the requesting user's account number is included in the data set 302 as an associated account number 318. In other embodiments, the query retrieves only data sets 302 corresponding to the list of site owner account numbers 316 in the request. In various embodiments, retrieving a data set 302 may include retrieving only the historical snowfall data 310, the current snowfall data 312, the predicted snowfall data 314, or some combination thereof.

Moving to block 706, in some embodiments the server 108 may interpolate data from retrieved data sets 302 to provide interpolated snowfall data for sites 109 that do not have weather stations 102, and as a result do not have data sets 302 in the database 216. Examples of appropriate interpolation algorithms include curve fitting algorithms, though the scope of embodiments is not limited to any particular interpolation algorithm. Moving to block 708, the server 108 then overlays the snowfall data 308 over the map 402 at addresses 306, and interpolated snowfall data over the map 402 in sites between addresses 306, creating map overlay data. Moving to block 710, the server 108 constructs heat map (or choropleth map) overlay data from the map overlay data. Moving to block 712, the server 108 sends the heat map overlay data to the device 400. Moving to block 714, the device 400 displays the heat map overlay data on map 402.

Figure 8:
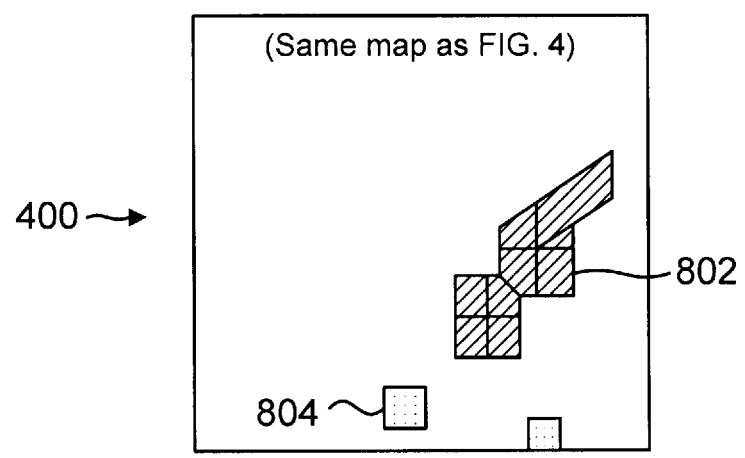
FIG. 8 illustrates an example graphical user interface on a mobile computing device configured to display legal snowfall limit alert data in a map format according to an embodiment of the present disclosure.

As described above, some municipalities have regulations that allow for fining property owners if snowfall accumulation on their property exceeds a specified threshold. Referring now to FIG. 8, there is illustrated an embodiment of a user interface displaying legal snowfall limit alert data output to an account having multiple sites associated with it. For example, this could be a commercial property owner's account, a residential landlord's account, or a landscaping contractor's account. The device 400 displays a map 402 as described with reference to FIG. 1. A visual alert 802 is overlaid only at sites 109 where the snowfall amount has reached a specified legal threshold. This information allows the operator to know that the sites 109 are a top priority. In some embodiments, a warning alert 804 is overlaid at a site 109 when the central server 108 predicts that the snowfall amount at the site 109 will pass the specified legal threshold in the near future. This allows the operator to plan ahead and allocate resources to clear snow at the site 109 before it actually reaches the legal snowfall limit. In some embodiments, alerts 802 and warning alerts 804 may be animated to display changes over time, illustrating predicted alerts.

Figure 9:
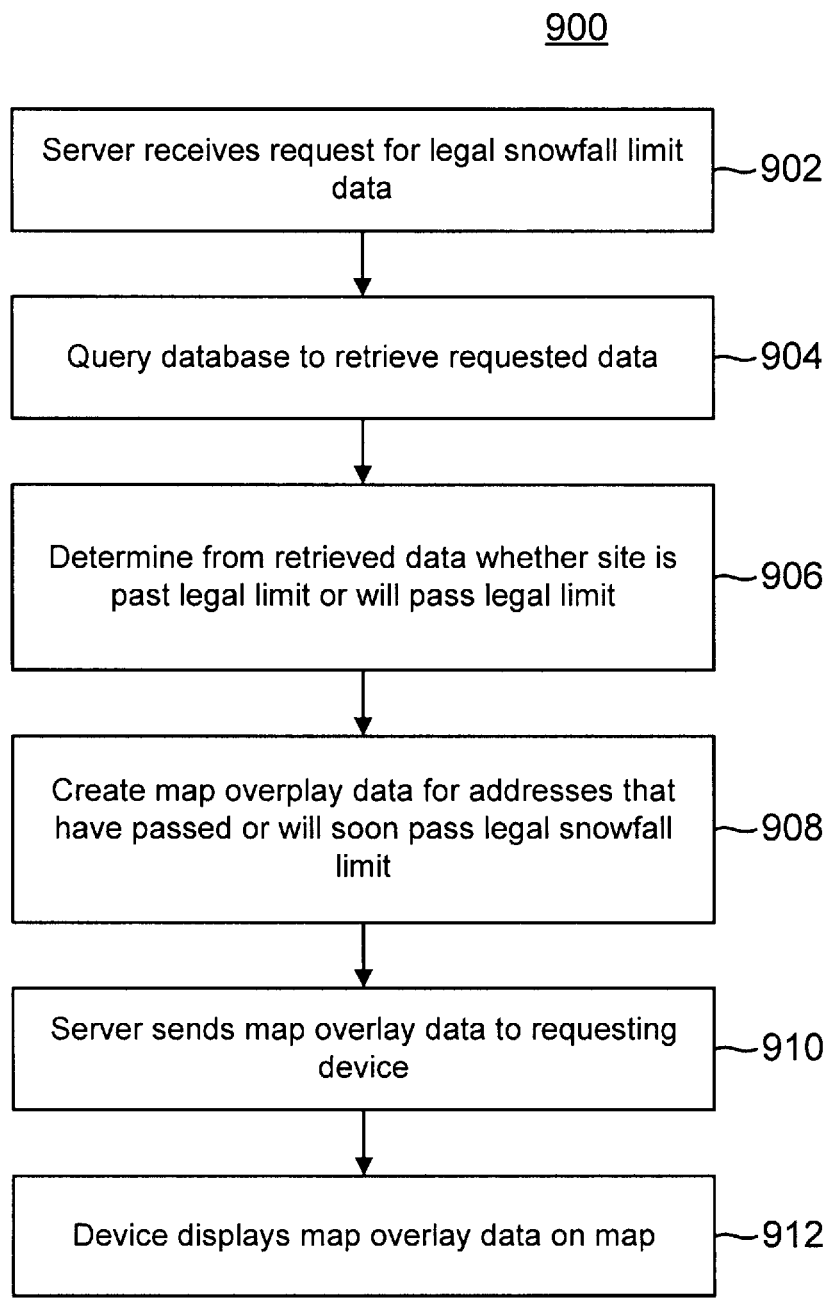
FIG. 9 illustrates an example method for providing legal snowfall limit alert data to user devices with the graphical interface of FIG. 8.

Referring now to FIG. 9, there is illustrated a flowchart of a method 900 for providing the legal limit alert data of FIG. 8. In this example, method 900 includes among other things searching a database (such as a database 216 of FIG. 3) for desired data, processing that data into usable data, and providing meaningful output in a visual form to a client device such as device 400.

Beginning at block 902, the central server 108 receives a request from the device 400 associated with a user account, for instance a landscape contractor's user account, for legal snowfall limit data from sites 109 associated with the user account. In some embodiments, the request may contain a list of site owner account numbers 316 correlated to the sites 109 for which data is being requested. In some embodiments, the request may contain map data related to map 402, for example the boundaries of map 402. Moving to block 904, the server 108 queries database 216 to retrieve the requested data. In some embodiments, the request is limited to data from sites that are within the boundaries of map 402. In some embodiments, the query retrieves only data sets 302 for which the requesting user's account number is included in the data set 302 as an associated account number 318. In other embodiments, the query retrieves only data sets 302 corresponding to the list of site owner account numbers 316 in the request. In various embodiments, retrieving a data set 302 may include retrieving only the current snowfall data 312, the predicted snowfall data 314, or both.

Moving to block 906, the server 108 uses the current snowfall data 312 and/or the predicted snowfall data 314 to determine, for the area within map boundaries 402, which sites 109 currently surpass or imminently will surpass a legal threshold of snowfall accumulation. Moving to block 908, the server 108 then uses the determination of block 906 to designate which addresses 306 currently surpass or imminently will surpass the legal threshold of snowfall accumulation, creating map overlay data. Moving to block 910, the server 108 sends the map overlay data to device 400. Moving to block 912, the device 400 displays the map overlay data on map 402.

Figure 10:
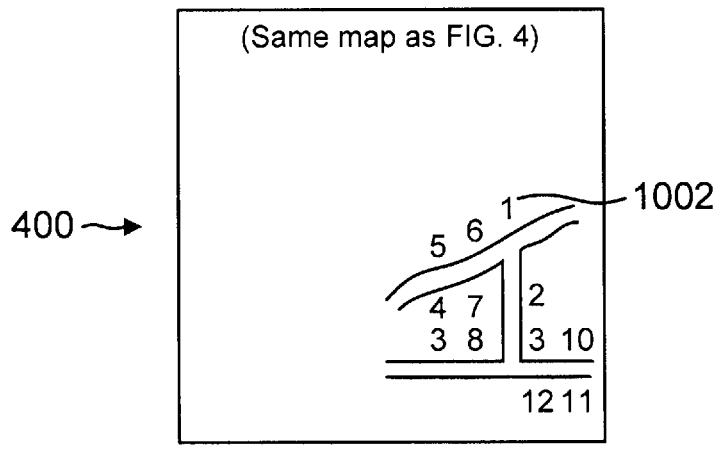
FIG. 10 illustrates an example graphical user interface on a mobile computing device configured to display priority data in a map format according to an embodiment of the present disclosure.

In some embodiments, a contractor operator may want to automate the process of prioritizing sites 109 for allocation of snow removal resources. The system may therefore construct a priority order for allocation of snow clearing resources to sites 109 based on certain preferences specified by the operator, as described below with reference to FIG. 11. Referring now to FIG. 10, there is illustrated a further embodiment of a user interface displaying snowfall data output to an account having multiple sites associated with it. The device 400 displays a map 402 as described with reference to FIG. 1. Priority indicators 1002 are overlaid on the map 402 at sites 109 which are associated with the operator's account. In some embodiments, priority indicators 1002 take the form of ordinal numbers which indicate the priority order in which the sites 109 are to be allocated snow clearing resources.

Figure 11:
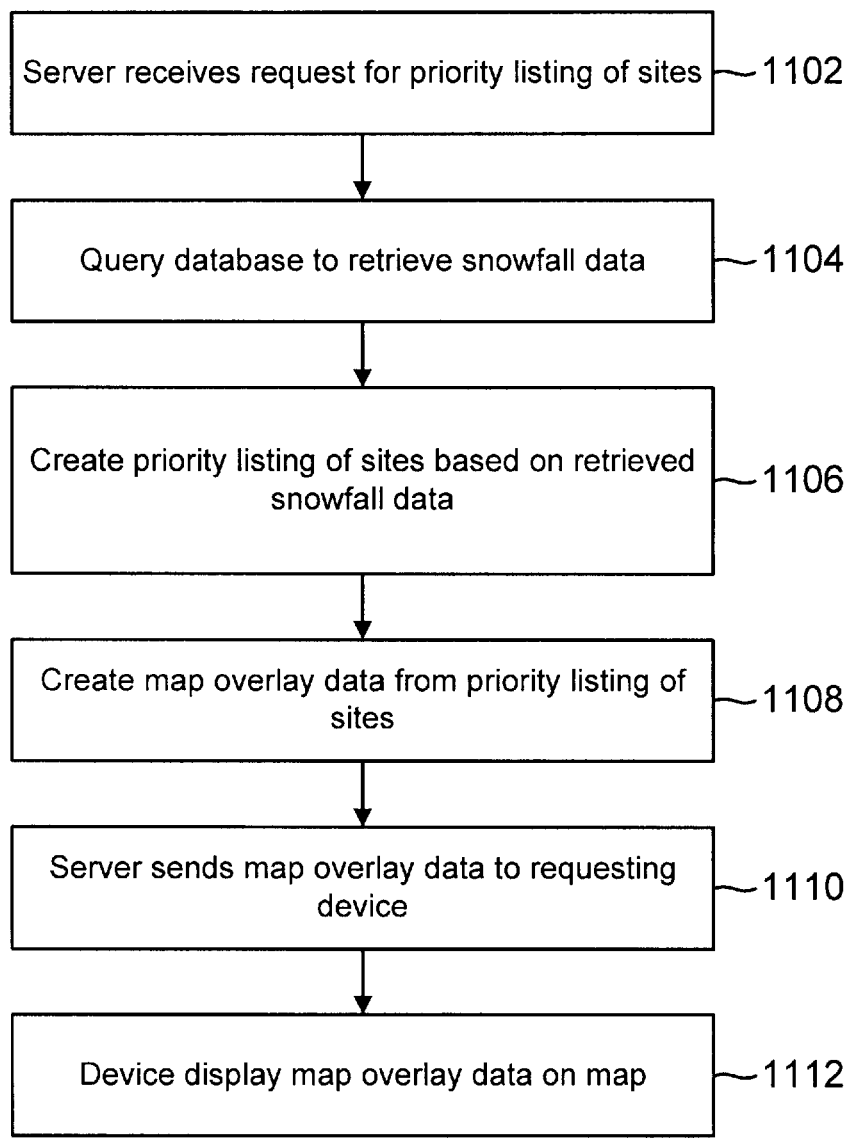
FIG. 11 illustrates an example method for providing priority data to user devices with the graphical interface of FIG. 10.

Referring now to FIG. 11, there is illustrated a flowchart of a method 1100 for providing the priority data of FIG. 10. In this example, method 1100 includes among other things searching a database (such as a database 216 of FIG. 3) for desired data, processing that data into a requested data format, and providing meaningful output in a visual form to a client device such as device 400.

Beginning at block 1102, the central server 108 receives a request from a device 400 associated with a user account, for instance a landscape contractor's user account, for a priority listing of sites 109 associated with the user account. In some embodiments, the request may contain a list of site owner account numbers 316 correlated to the sites 109 for which data is being requested. In some embodiments, the request may contain map data related to map 402, for example the boundaries of map 402. Moving to block 1104, the server 108 queries database 216 to retrieve the requested data. In some embodiments, the request is limited to data from sites that are within the boundaries of map 402. In some embodiments, the query retrieves only data sets 302 for which the requesting user's account number is included in the data set 302 as an associated account number 318. In other embodiments, the query retrieves only data sets 302 corresponding to the list of site owner account numbers 316 in the request. In various embodiments, retrieving a data set 302 may include retrieving only the current snowfall data 312, the predicted snowfall data 314, or both.

Moving to block 1106, the server 108 uses the retrieved data sets 302 to organize the associated sites 109 in order of priority. In some embodiments, the server 108 orders sites 109 based on the amount of snowfall at each site 109, from highest amount to lowest amount. In some embodiments, sites 109 are ordered based on a combination of the amount of snowfall at each site 109 and the relative locations of each site 109. For example, to minimize backtracking, a first site having a lower amount of accumulated snowfall than a second site may be assigned a higher priority than the second site because it is geographically closer to the previous site in the list. In some embodiments, a minimum or maximum distance between consecutive sites in the priority list may be specified in the request from device 400. In some embodiments, the server 108 calculates the expected amount of time to complete work on each site 109, and factors it into the priority order. In some embodiments, the server 108 factors into the priority order predictions of future snowfall at all sites 109. In some embodiments, the server 108 factors into the priority other parameters such as whether the site is a residential, commercial or government site, whether the site owner's contract specifies special higher priority treatment, or the like. Such additional parameters may be included in data sets 302 within database 216.

Moving to block 1108, the server 108 associates each site 109's address 306 with the site's number in the priority order, creating map overlay data. Moving to block 1110, the server 108 sends the map overlay data to device 400. Moving to block 1112, the device 400 displays the map overlay data on map 402.

Figure 12:
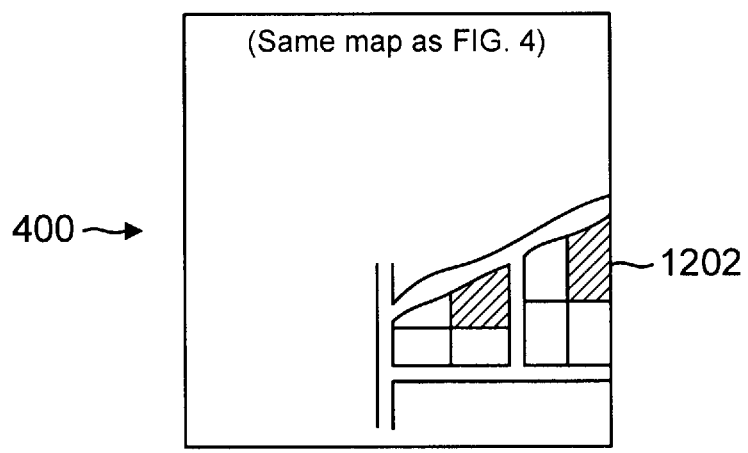
FIG. 12 illustrates an example graphical user interface on a mobile computing device configured to display potential client alert data in a map format according to an embodiment of the present disclosure.

In many markets it is likely that a given contractor will not have contracts with the owners of all sites 109. In some embodiments, the map 402 may indicate potential new clients to operators of device 400. Referring now to FIG. 12, there is illustrated an embodiment of a user interface displaying potential customer alert data output to an account having multiple sites associated with it. A device 400 displays a map 402 as described with reference to FIG. 1. A potential customer indicator 1202 is shown overlaid on some sites 109 which are not shown as under contract on the operator's account. The sites 109 which receive a potential customer indicator 1202 may be filtered based on various criteria, such as proximity to other sites 109 already under contract, historical, current or predicted snowfall amounts, imminent crossing of the legal threshold, etc. The sites 109 which receive a potential customer indicator 1202 may or may not have a weather station 102 installed on them. If they do not have a weather station 102 installed on them, a potential customer indicator 1202 may be assigned based on interpolated data from nearby sites 109 which do have weather stations 102 installed on them. The potential customer indicator 1202 may be configured to additionally indicate various other pieces of information about site 109, such as whether or not the site 109 has a weather station 102 installed, whether previous attempts have been made at offering a contract to the property owner of the site, whether the site is under contract with an owner of another account, etc.

Figure 13:
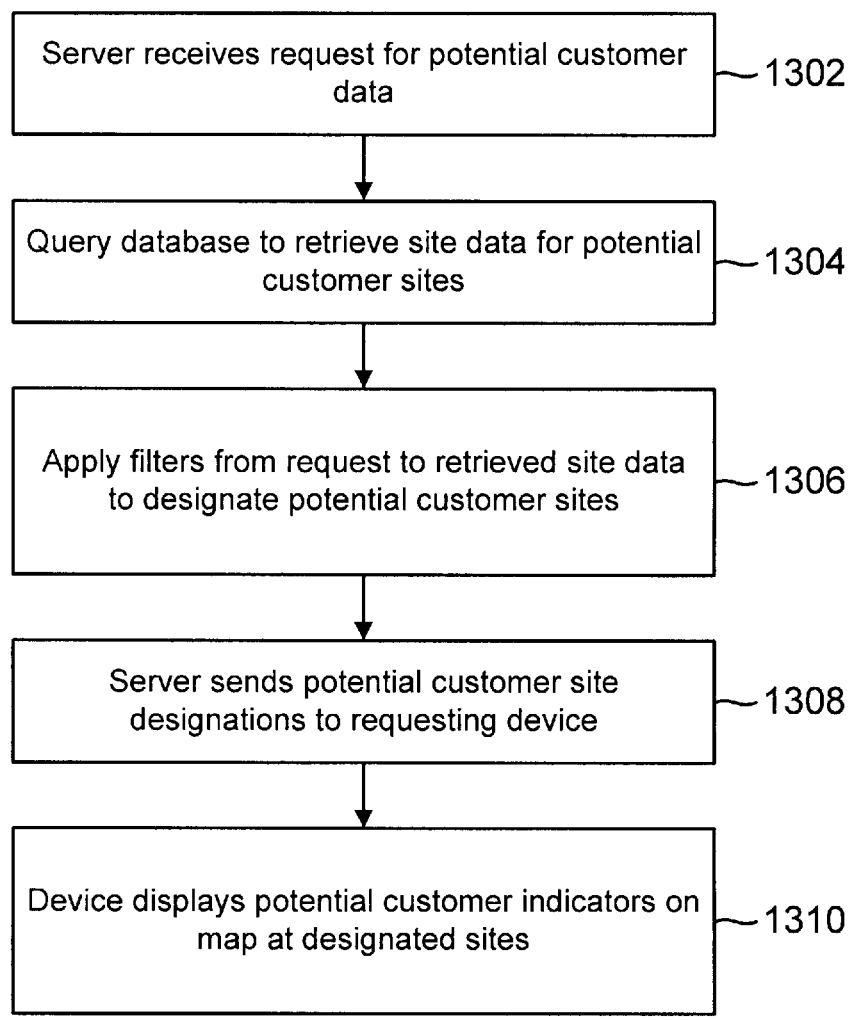
FIG. 13 illustrates an example method for providing potential customer alert data to user devices with the graphical interface of FIG. 12.

Referring now to FIG. 13, there is illustrated a flowchart of a method 1300 for providing the potential customer recommendations of FIG. 12. In this example, method 1300 includes among other things searching a database (such as a database 216 of FIG. 3) for desired data, processing that data into usable data, and providing meaningful output in a visual form to a client device such as device 400.

Beginning at block 1302, the central server 108 receives a request from a device 400 associated with a user account, for instance a landscape contractor's user account, for potential customers that have accounts which are not currently associated with the user account (e.g., accounts that are not currently customers of the landscape contractor). In some embodiments, the request includes filter criteria as described above with reference to FIG. 12. For example, proximity to other sites 109 already under contract, historical, current or predicted snowfall amounts, imminent crossing of the legal threshold, etc. In some embodiments, the request may contain map data related to map 402, for example the boundaries of map 402. Moving to block 1304, the server 108 queries database 216 to retrieve the data sets 302 corresponding to requested potential customer sites. In some embodiments, the request is limited to data from sites that are within the boundaries of map 402. In some embodiments, data is interpolated from retrieved data sets 302 to create data for sites 109 that do not have weather stations 102, and as a result do not have data sets 302 in the database 216. In some embodiments, data sets 302 may include information on whether previous attempts have been made at offering a contract to the property owner of the site, whether the site is under contract with another account, etc. Moving to block 1306, the server 108 uses the data sets 302 and interpolated data to assign potential customer designations based on the filters provided in the request. Moving to block 1308, the server 108 sends the addresses 306 of sites 109 designated as potential customers to the device 400. Moving to block 1310, the device 400 displays potential customer indicators 1202 over map 402 on sites designated as potential customers.

Figure 14:
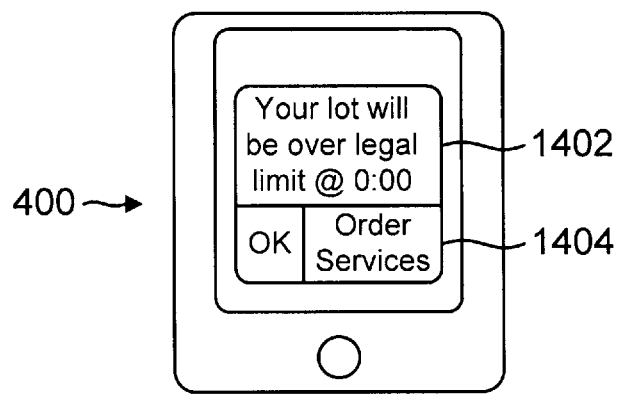
FIG. 14 illustrates an example graphical user interface on a mobile computing device configured to display snowfall alert data in a popup format according to an embodiment of the present disclosure.

Some users may not be interested in detailed analysis of snowfall data at sites 109 related (or unrelated) to their account. Referring now to FIG. 14, there is illustrated an embodiment of a user interface displaying snowfall alert data as messages triggered by snowfall events at a site or sites 109. In some embodiments, a message or messages 1402 may be displayed on a device 400 in a pop-up type alert, a heads-up type notification, or the like. The message 1402 may inform the operator of various things related to snowfall data at a site or sites 109 associated with the operator's account. For example, a residential account owner might receive a message 1402 informing him that the snowfall level at his site 109 (e.g. his residence, business, or the like) is over the regulated limit and he is in danger of being fined. Alternatively, he may receive a message 1402 informing him that at a specified time in the future it is predicted that the snowfall at his site 109 will have exceeded the regulated limit. In some embodiments an account owner may have more than one site 109 associated with her account, as in the case of a landlord or a commercial property owner. Messages 1402 may additionally indicate which site 109 they are referring to.

Figure 15:
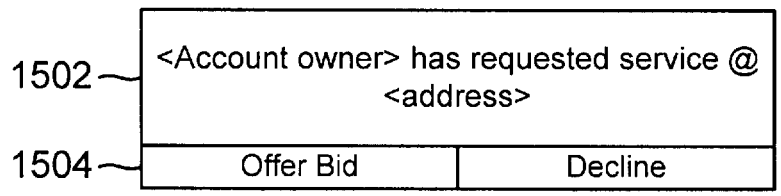
FIG. 15 illustrates an example graphical user interface on a mobile computing device configured to display snowfall alert data in a popup format according to an embodiment of the present disclosure.

In some embodiments, there may be a button or other interface element 1404 which allows the account owner to request a landscape contractor to clear snow at their site or sites 109. If the account owner already has a contract in place with a landscape contractor, that contractor may receive an alert message 1402 informing them that help has been requested at the site 109. Alert message 1402 may include any appropriate format, including a text message, an email message, an audio phone message, and in-app alert, etc. This is illustrated in FIG. 15, where alert 1502 is displayed to the contractor on a device 400. Referring again to FIG. 14, if the account owner does not have a pre-existing contract in place with a landscape contractor, then activating interface element 1404 may send an alert 1502 to all landscape contractors that work in the area. The alert 1502 may display an interface element 1504 that allows them to choose whether or not to submit a bid for services at site 109. In another embodiment, activating interface element 1404 sends the account owner to an interface listing local landscape contractors and their service prices, allowing the account owner to send an alert 1502 to a contractor of their choice.

Figure 16:
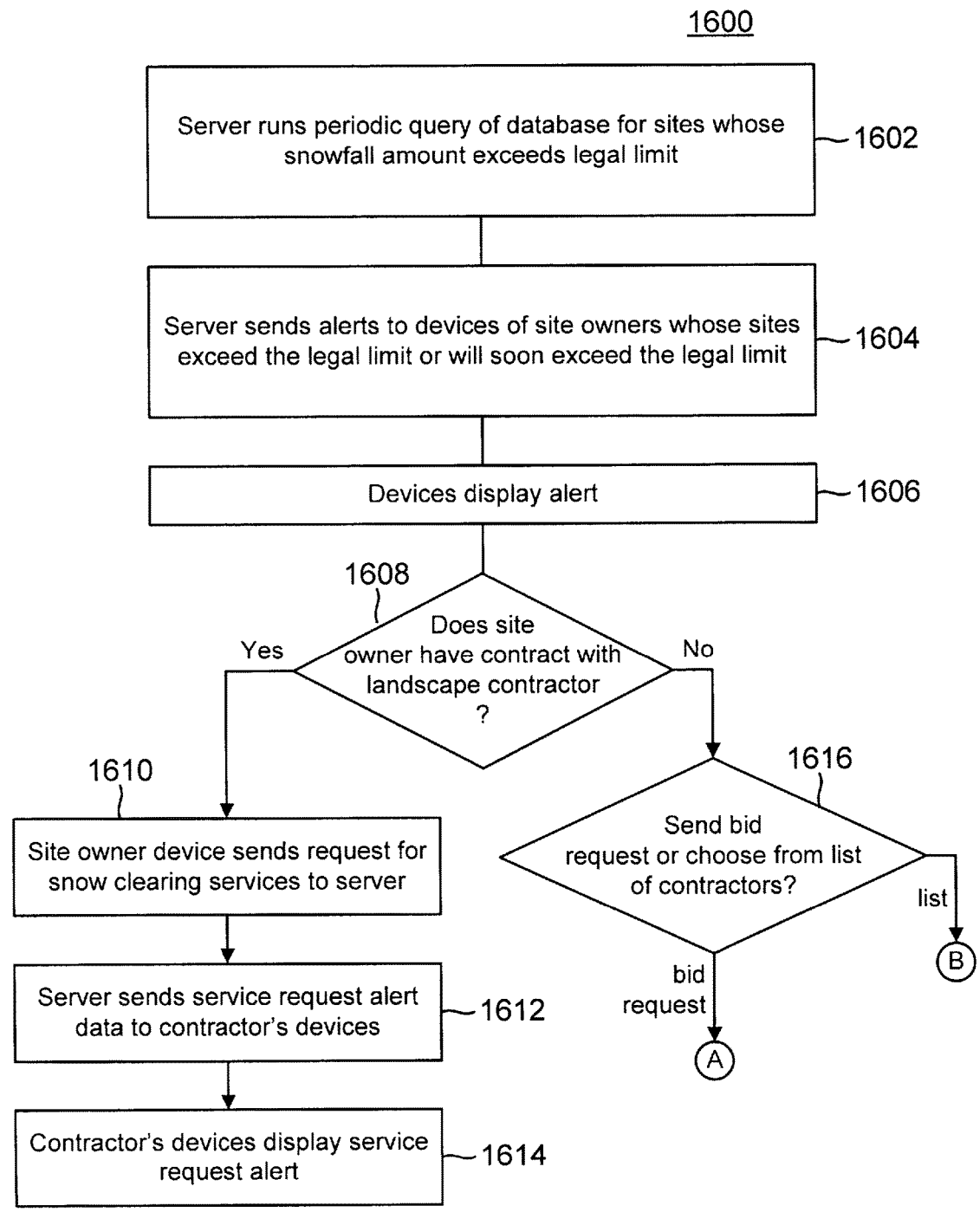
FIG. 16 illustrates an example method for providing snowfall alert data to user devices with the graphical interface of FIGS. 14 and 15.
Figure 16:
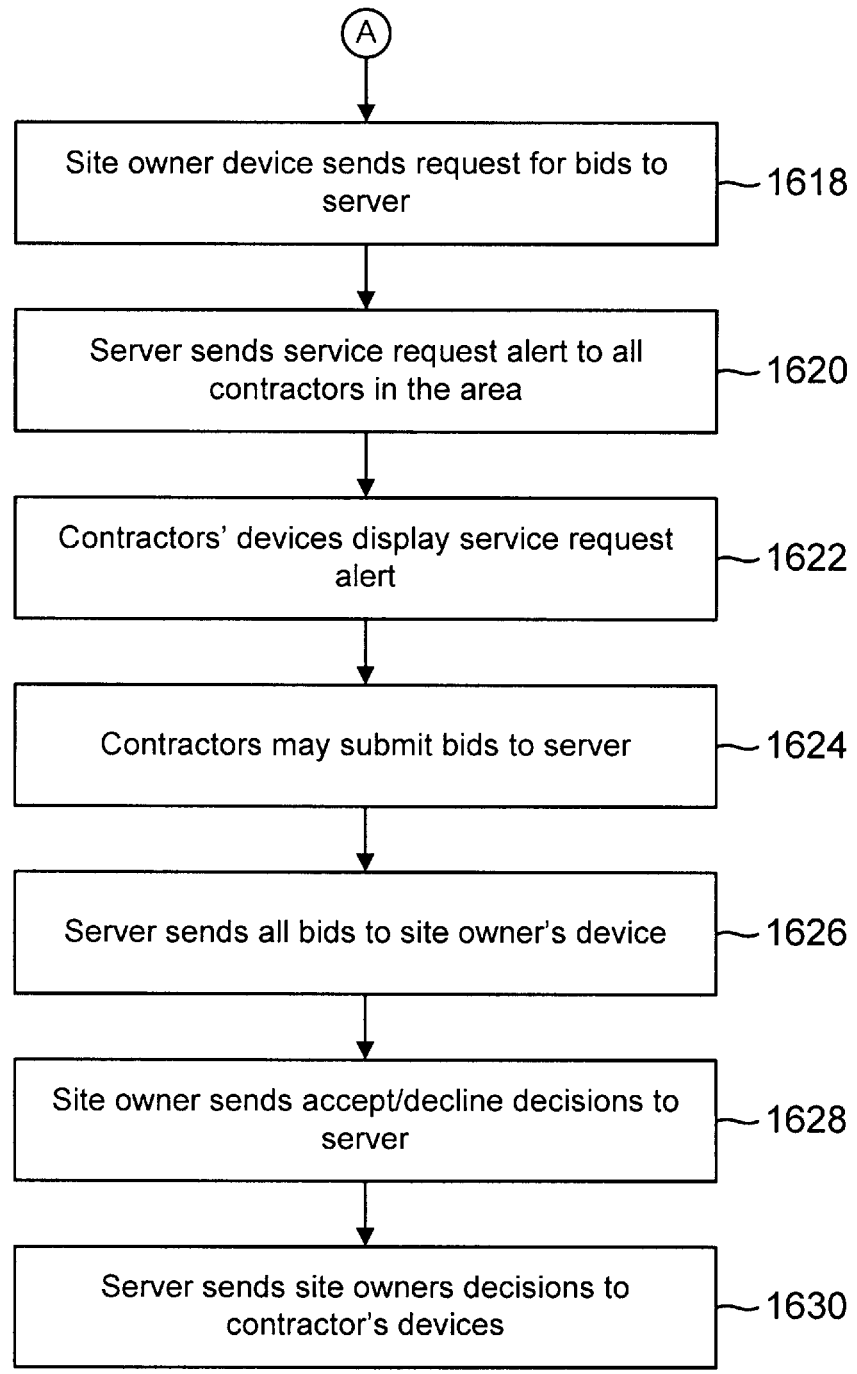
Figure 16:
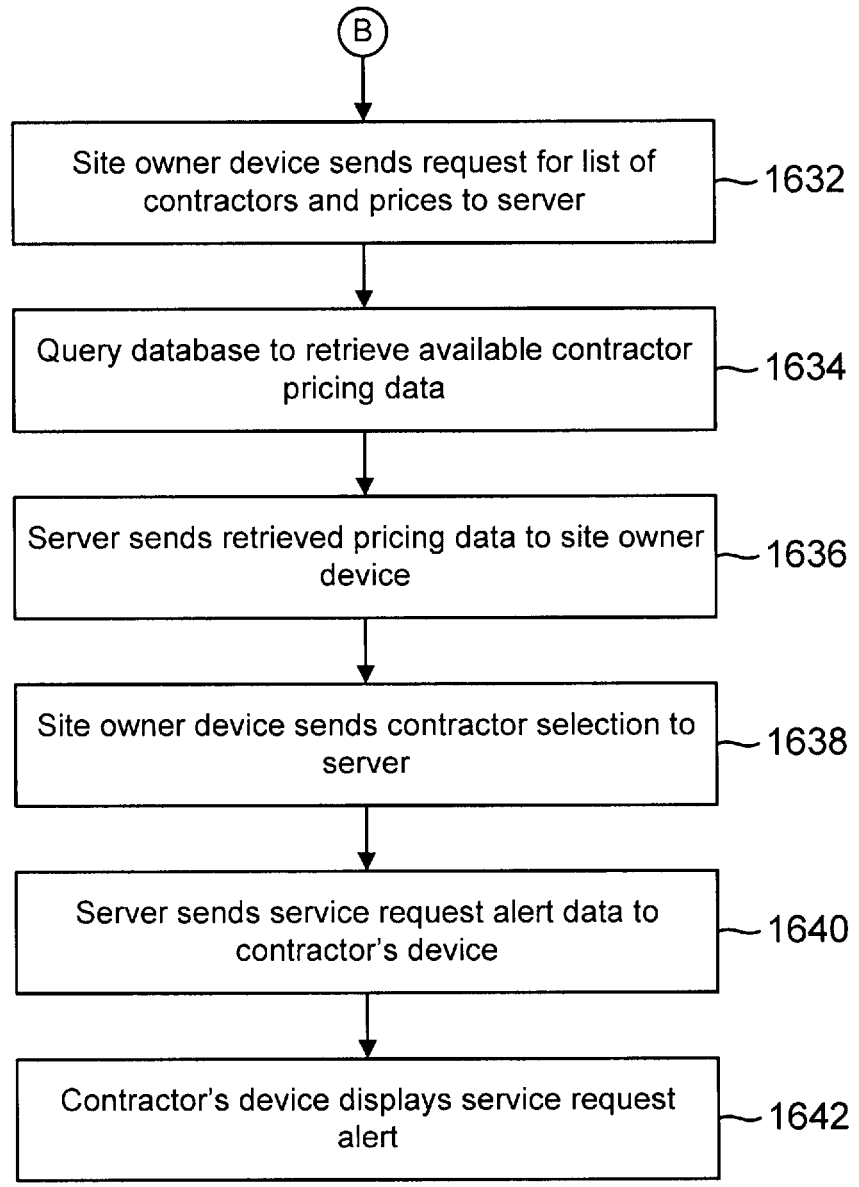

Referring now to FIG. 16, there is illustrated a flowchart of a method 1600 for providing the snowfall alerts of FIGS. 14 and 15. In this example, method 1600 includes among other things searching a database (such as a database 216 of FIG. 3) for desired data, processing that data into usable data, providing meaningful output in a visual form to a client device such as device 400, and relaying communications between multiple client devices.

Beginning at block 1602, the server 108 runs a periodic query of database 216 to check for sites 109 whose current snowfall data 312 shows a snowfall amount that currently exceeds a legal threshold amount, or sites 109 whose predicted snowfall data 314 shows a snowfall amount that will imminently surpass the legal threshold amount. Moving to block 1604, the server 108 sends snowfall alert data to devices 400 belonging to site owners whose sites 109 were returned by the query at block 1602. Moving to block 1606, the devices 400 that receive alert data from the server 108 display alerts 1402 based on the alert data. In some embodiments, alerts 1402 inform the site owner that their site 109 is currently over the legal snowfall limit. In other embodiments, alerts 1402 inform the site owner that snowfall accumulation at their site 109 will soon surpass the legal limit. The alerts 1402 may additionally contain a prediction of the time at which snowfall accumulation on the site 109 will surpass the legal limit.

Moving to block 1608, if the site owner has a contract in place with a landscape contractor then the method proceeds to block 1610, otherwise the method proceeds to block 1616. Moving to block 1610, the site owner may, in response to an alert 1402, send a request for snow clearing services to central server 108. Moving to block 1612, in response to the service request the server 108 sends service request alert data to the devices 400 of landscape contractors who have an account 318 associated with the site owner's account (i.e., landscape contractors who have a contract with site owner). Moving to block 1614, the landscape contractors' devices 400 display an alert 1502 informing them of the service request from the owner of the site 109.

In the case that no contractors have an account 318 associated with the site owner's account, the method progresses to block 1616. At block 1616, the site owner may choose whether to send a service request to all or a subset of contractors working in the area, in which case the method proceeds to block 1618. Otherwise the method progresses to block 1632. Moving to block 1618, the site owner sends a request for snow removal service bids to the server 108. Moving to block 1620, the server 108 sends service request alert data to all or a subset of contractors working in the area. Moving to block 1622, the landscape contractors' devices 400 display a service request alert 1502. Moving to block 1624, the contractors may use interface element 1504 to submit a bid to server 108. Moving to block 1626, server 108 sends the received bids to the device 400 of the site owner who requested service. Moving to block 1628, the site owner sends to the server 108 its decision to accept or decline with respect to each bid. Moving to block 1630, the server 108 sends the results of the bid to each contractor's device 400.

Moving to block 1632, in an alternative to block 1618 the user of device 400 may send a request to central server 108 for a list of available contractors and their service prices. Moving to block 1634, the server queries database 216 to retrieve the requested data. Moving to block 1636, the server 108 sends the retrieved service price data to the site owner's device 400. Moving to block 1638, the site owner may select a contractor and send the selection to server 108. Moving to block 1640, the server 108 sends an alert to the selected contractor's device 400. Moving to block 1642, contractor's device 400 displays service request alert 1502.

Figure 17:
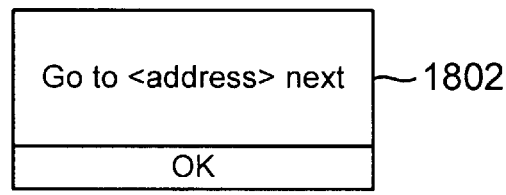
FIG. 17 illustrates an example graphical user interface on a mobile computing device configured to display snow plowing alert data in a popup format according to an embodiment of the present disclosure.
Figure 18:
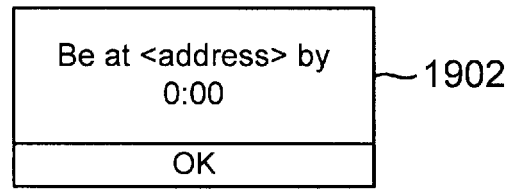
FIG. 18 illustrates an example graphical user interface on a mobile computing device configured to display snow plowing alert data in a popup format according to an embodiment of the present disclosure.

In various embodiments, the landscape contractor's equipment operator employees (i.e., employees who operate snow clearing equipment such as snow plows) may have devices 400 which support all or nearly all of the functions shown above at FIGS. 4, 6, 8, 10, and 12, or they may have a device 400 which only receives limited notifications. A contractor may choose an embodiment based on, for example, how much autonomy they want their equipment operator employees to have in moving between sites. Referring now to FIGS. 17 and 18, there are illustrated snow plowing alerts that an equipment operator's device 400 may receive. As illustrated in FIG. 17, one type of snow plowing alert 1802 may be displayed on device 400 that tells the operator, in a popup notification, the address of the next site 109 that the operator is to travel to. In some embodiments, the operator of device 400 may send a request for this information if the snow plowing alert 1802 is not displayed on device 400 by the time the operator is ready to travel to the next site 109. As illustrated in FIG. 18, another type of snow plowing alert 1902 may be displayed on device 400 that tells the operator, in a popup notification, a time frame during which he is expected to arrive at the next site 109.

Figure 19:
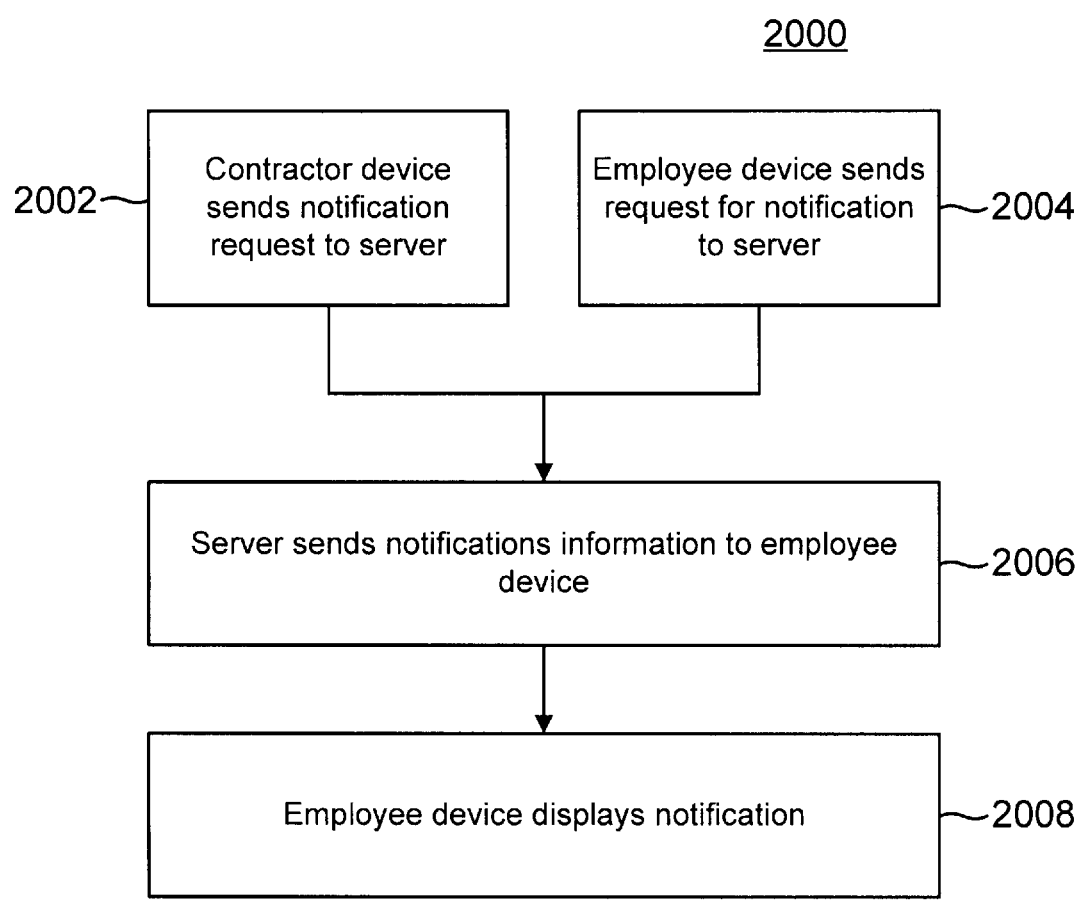
FIG. 19 illustrates an example method for providing snow plowing alert data to user devices with the graphical interface of FIGS. 17 and 18.

Referring now to FIG. 19, there is illustrated a flowchart of method 2000 for providing the popup notification snow plowing alerts of FIGS. 17 and 18. Beginning at block 2002, a contractor notifies central server 108 that it wishes to send a notification to an employee's device 400. Alternatively, beginning at block 2004, the employee may request a notification from server 108. Moving to block 2006, the server 108 sends notification information to the employee's device 400. Moving to block 2008, the device 400 displays a notification 1802 or 1902.

Figure 20:
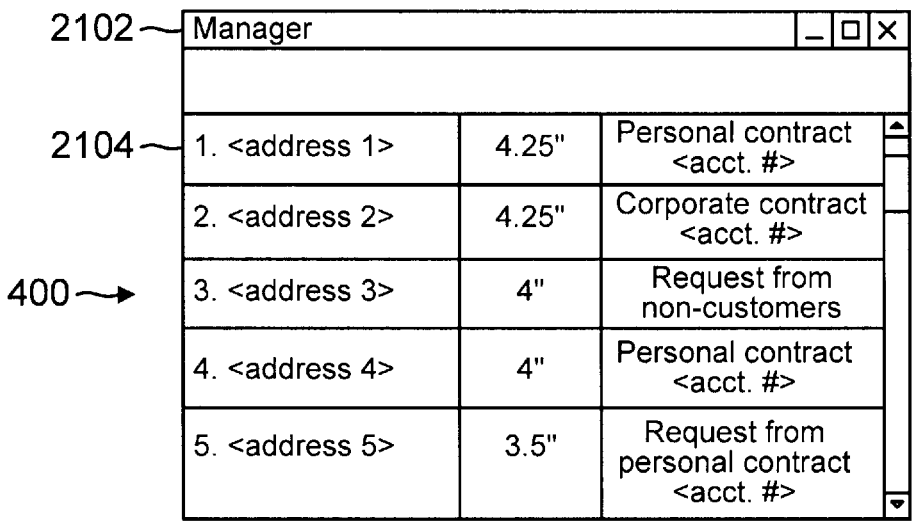
FIG. 20 illustrates an example graphical user interface on a mobile computing device configured to display snowfall alert data in a list format according to an embodiment of the present disclosure.

In some embodiments, a list-based display of snowfall data may be preferred. Referring now to FIG. 20, there is illustrated an embodiment of a user interface displaying snowfall alert data output in a list-based manner to an account having multiple sites associated with it. The device 400 displays a window 2102 which contains snowfall data, site data, and other information. Rows 2104 of data may each correspond to one site 109 associated with the device operator's account. The information displayed in rows 2104 may be retrieved by the central server 108 from the data set 302 associated with the site 109 in database 216. The rows 2104 may contain, for example, the address of the site 109, the amount of snowfall currently present at the site 109, and information about the site owner. The site owner information may include, for example, whether a contract exists with site owner, whether site owner is a personal, corporate or government entity, site owner's account number, whether site owner has requested service from the account owner, etc. In some embodiments, the rows 2104 may be organized in priority order in a similar manner as described above with reference to FIG. 10. In some embodiments, the device 400 may display window 2102 simultaneously with one or more of the embodiments of FIGS. 4, 6, 8, 10, and 12 as described above.

Figure 21:
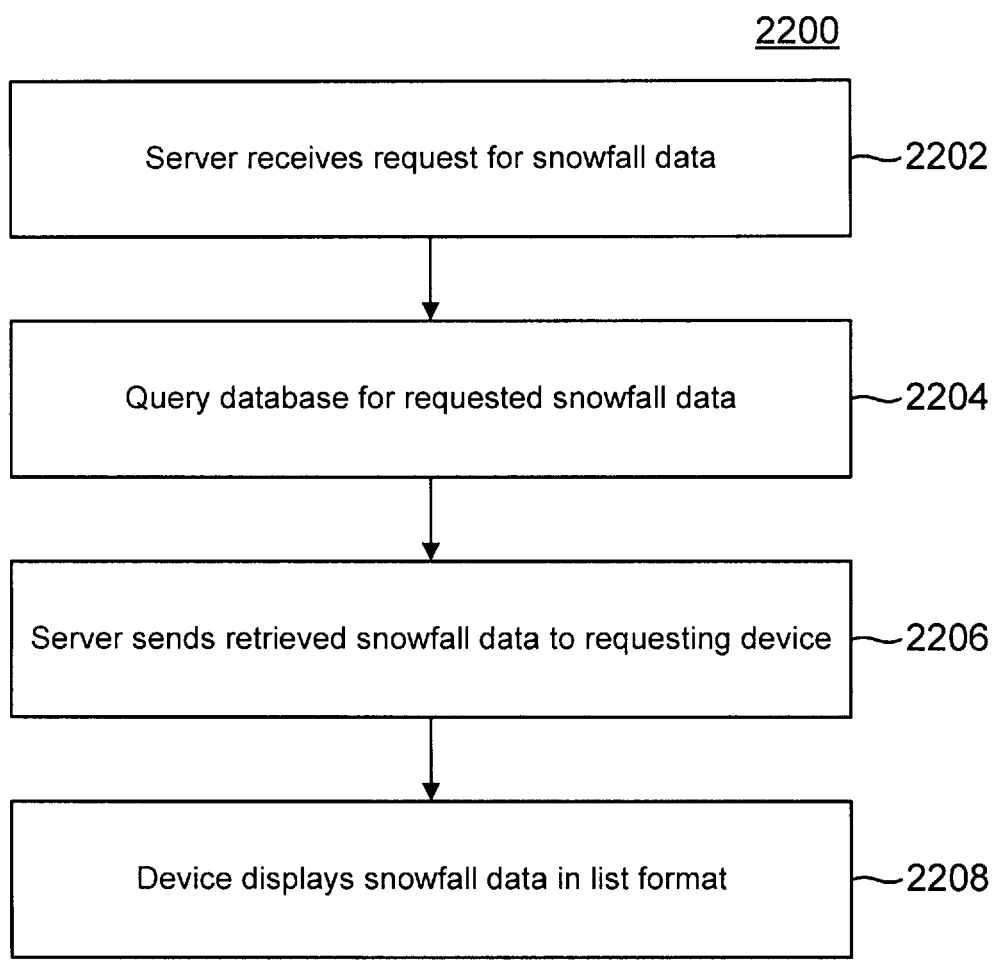
FIG. 21 illustrates an example method for providing snowfall alert data to user devices with the graphical interface of FIG. 20.

Referring now to FIG. 21, there is illustrated a flowchart of a method 2200 for delivering the snowfall data of FIG. 20. In this example, method 2200 includes among other things searching a database (such as a database 216 of FIG. 3) for desired data, processing that data into usable data, and providing meaningful output in a visual form to a client device such as device 400.

Beginning at block 2202, the central server 108 receives a request from a device 400 associated with a user account, for instance a landscape contractor's user account, for snowfall alert data from sites 109 associated with the user account. In some embodiments, the request may contain a list of site owner account numbers 316 correlated to the sites 109 for which data is being requested. Moving to block 2204, the server 108 queries database 216 to retrieve the requested data. In some embodiments, the query retrieves the data sets 302 for which the requesting user's account number is included in the data set 302 as an associated account number 318. In other embodiments, the query retrieves the data sets 302 corresponding to the list of site owner account numbers 316 in the request. Moving to block 2206, the server 108 sends the snowfall alert data back to the device 400. Moving to block 2208, the device 400 displays the data in list format 2104 within window 2102.

Figure 22:
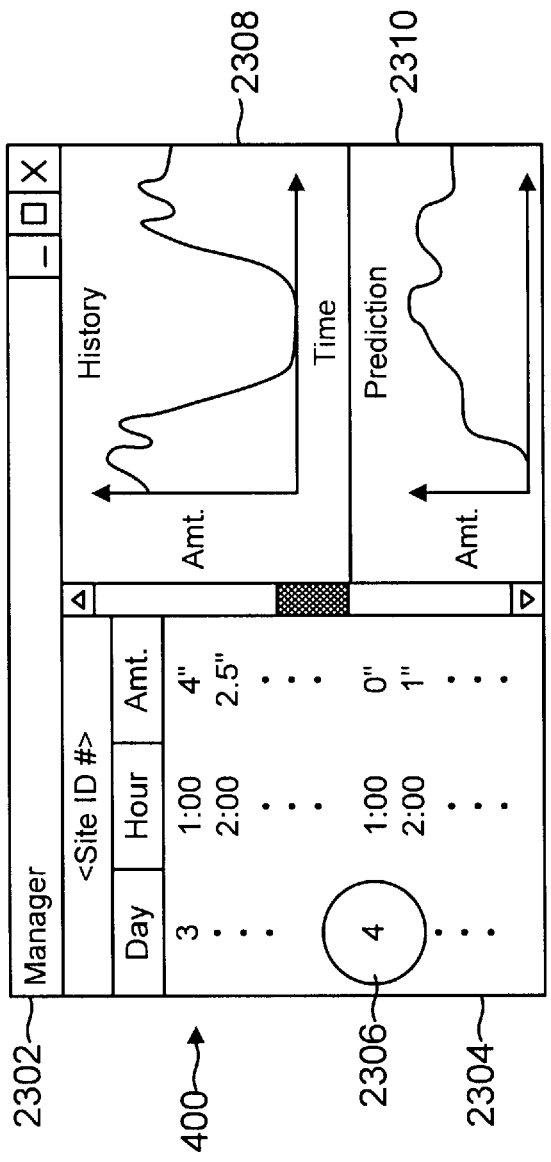
FIG. 22 illustrates an example graphical user interface on a mobile computing device configured to display snowfall alert data in a hybrid list and graph format according to an embodiment of the present disclosure.

Referring now to FIG. 22, there is illustrated an embodiment of a user interface displaying detailed snowfall alert data related to a specific site 109. The device 400 displays a window 2302 containing detailed information related to a specific site 109. This detailed information is retrieved by the central server 108 from the database 216. Data from a data set 302 associated with a given site 109 is processed by the central server 108 to various usable formats for display on device 400. For example, timeline 2304 displays snowfall data for the site 109 at a time granularity selected by the operator (e.g., minute by minute, hour by hour, day by day). In some embodiments, the operator may select a time point 2306 to open visualization 2308 of the data surrounding that time point. In other embodiments, the visualization 2308 may be a constantly updating visualization of the current and recent snowfall data for the site 109. In some embodiments, visualization 2310 of the predicted snowfall at the site 109 may be displayed in addition to or instead of visualization 2308. In some embodiments, the time scale and granularity for the visualizations 2308 and 2310 may be scaled by the operator. In some embodiments, the method for delivering the snowfall data from server 108 to device 400 is similar to method 2200 described in FIG. 21.

It is understood that any of the above embodiments of a user interface displaying snowfall data output could be combined to provide multiple different views of snowfall data to an operator simultaneously. Moreover, it is understood that when any of the above embodiments of a user interface are combined, the accompanying methods of retrieving and organizing the necessary data may be combined to achieve the combined user interface.

The invention claimed is:

1. A method comprising:

at a central server, receiving site-based snowfall data for a multitude of different sites and from a multitude of weather stations within a geographic area;

at the central server, correlating the received site-based snowfall data with a multitude of user accounts;

for each of the user accounts, providing real-time snowfall alert data corresponding to each respective user account, wherein a first set of the user accounts includes user accounts corresponding to a single respective site, and wherein a second set of the user accounts includes user accounts corresponding to multiple sites, wherein providing snowfall alert data includes providing map overlay data, wherein the map overlay data comprises snowfall amount data associated with each respective site and map coordinates associated with each respective site;

wherein providing snowfall alert data corresponding to each respective user account includes, at the central server, retrieving site-based snowfall data from a database entry associated with each respective site corresponding to each respective user account; and wherein providing snowfall alert data corresponding to each respective user account includes, at the central server, transmitting the retrieved site-based snowfall data, including the snowfall amount data associated with each respective site and the map coordinates associated with each respective site, over a network to a plurality of mobile devices associated with the respective user accounts; and causing the plurality of mobile devices to display map interfaces incorporating the snowfall amount data and the map coordinates.

2. The method of claim 1, further comprising receiving site-based precipitation data and temperature data for the multitude of different sites within the geographic area.

3. The method of claim 1, wherein the snowfall amount data comprises at least one of historical snowfall data, current snowfall data, or predicted snowfall data.

4. The method of claim 1, wherein the map overlay data is choropleth map overlay data.

5. The method of claim 1, wherein the map overlay data further comprises legal limit alert data, wherein the legal limit alert data comprises snowfall amount data for each respective site and a legal snowfall limit at each respective site.

6. The method of claim 1, wherein the map overlay data includes priority data, wherein the central server determines the priority data based on at least one of amount of current snowfall at each respective site, amount of predicted snowfall at each site, relative location of each site, expected amount of time to clear snow from each site, and type of site.

7. The method of claim 1, wherein the map overlay data includes potential customer data for each respective site, wherein the central server determines the potential customer data based on the snowfall data for each respective site and at least one of a legal snowfall limit at each site, whether each site has a weather station, and previous contract offers for each site.

8. The method of claim 1, further comprising:

at the central server, determining based upon the snowfall data whether a snowfall amount at at least one site has surpassed or will soon surpass a legal snowfall limit;

at the central server, receiving a request for services from at least one of the first set of user accounts; and providing the request for services to at least one of the second set of user accounts, wherein the first set of user accounts comprises user accounts correlated with the at least one site that has surpassed or will soon surpass the legal snowfall limit.

9. The method of claim 1, further comprising:

at the central server, determining based upon the snowfall data whether a snowfall amount at a site has surpassed or will soon surpass a legal snowfall limit;

at the central server, receiving a request from at least one of the first set of user accounts for bids for services;

providing the request for the bids for services to at least one of the second set of user accounts;

at the central server, receiving the bids for services from the at least one of the second set of user accounts;

providing the bids for services to the at least one of the first set of user accounts;

at the central server, receiving a decision on the bids for services from the at least one of the first set of user accounts; and providing the decision on the bids for services to the at least of the second set of user accounts.

10. The method of claim 1, further comprising:

at the central server, determining based upon the snowfall data whether a snowfall amount at a site has surpassed or will soon surpass a legal snowfall limit;

at the central server, receiving a request from at least one of the first set of user accounts for a list of at least one of the second user accounts capable of providing services;

at the central server, determining from a database the list of at least one of the second user accounts capable of providing services;

providing the at least one of the first set of user accounts with the list of at least one of the second user accounts capable of providing services;

at the central server, receiving from the at least one of the first set of user accounts a chosen user account from the list of at least one of the second user accounts capable of providing services; and providing the chosen user account from the list of at least one of the second user accounts with a service request.

11. The method of claim 1, wherein providing snowfall alert data includes providing snow plowing alerts to one or more snow plowing contractors.

12. The method of claim 11, further comprising:

at the central server, receiving a request to notify the one or more snow plowing contractors of the snow plowing alerts.

13. The method of claim 1, wherein the snowfall alert data includes at least one of an ID number associated with each respective site, map coordinates associated with each respective site, snowfall amount data associated with each respective site, an account number associated with an owner of each respective site, account numbers associated with service providers having contracts with the owner of each respective site, and a legal snowfall limit at each respective site.

14. The method of claim 1, wherein correlating the received site-based snowfall data with the multitude of user accounts includes, at the central server, storing the received site-based snowfall data in a database such that site-based snowfall data corresponding to each respective site is stored in an entry in the database which corresponds to an account correlated with an owner of each respective site.

15. The method of claim 1, wherein the central server interpolates site-based snowfall data for sites that do not have a database entry associated with them, wherein the interpolation is based on site-based snowfall data retrieved from database entries associated with sites that are geographically close to the sites that do not have a database entry associated with them.

16. A computer program product having a non-transitory computer readable medium tangibly recording computer program logic for providing snowfall data alerts, the computer program product comprising:
  code to receive site-based snowfall data for a multitude of different sites and from a multitude of weather stations within a geographic area;
  code to correlate the received site-based snowfall data with a multitude of user accounts;
  code to provide real-time snowfall alert data corresponding to each respective user account, wherein a first set of the user accounts includes user accounts corresponding to a single respective site, and wherein a second set of the user accounts includes user accounts corresponding to multiple sites,
  wherein providing snowfall alert data includes providing map overlay data, wherein the map overlay data comprises snowfall amount data associated with each respective site and map coordinates associated with each respective site;
  wherein providing snowfall alert data corresponding to each respective user account includes retrieving site-based snowfall data from a database entry associated with each respective site corresponding to each respective user account; and
  wherein providing snowfall alert data corresponding to each respective user account includes transmitting the retrieved site-based snowfall data, including the snowfall amount data associated with each respective site and the map coordinates associated with each respective site, from a central server over a network to a plurality of mobile devices associated with the respective user accounts; and
  code to cause the plurality of mobile devices to display map interfaces incorporating the snowfall amount data and the map coordinates.

17. A system comprising:
  a central server;
  a database;
  a transmitter; and
  a receiver,
  wherein the central server is configured to receive site-based snowfall data for a multitude of different sites and from a multitude of weather stations within a geographic area,
  wherein the central server is configured to correlate the received site-based snowfall data with a multitude of user accounts, and
  wherein the central server is configured to provide real-time snowfall alert data corresponding to each respective user account, wherein a first set of the user accounts includes user accounts corresponding to a single respective site, and wherein a second set of the user accounts includes user accounts corresponding to multiple sites,
  wherein the map overlay data comprises snowfall amount data associated with each respective site and map coordinates associated with each respective site;
  wherein the central server is further configured to retrieve site-based snowfall data from a database entry associated with each respective site corresponding to each respective user account; and
  wherein the central server is further configured to transmit the retrieved site-based snowfall data, including snowfall amount data associated with each respective site and the map coordinates associated with each respective site, over a network to a plurality of mobile devices associated with the respective user accounts;
  wherein the central server is further configured to cause the plurality of mobile devices associated with ones of the user accounts to display map interfaces incorporating the snowfall amount data and the map coordinates.

18. The method of claim 1, further comprising:
for each respective user account, providing visual differentiation in the map interface between sites associated with the respective user account and sites not associated with the respective user account.

* * * * *